April 6, 1937.  A. L. SPAFFORD  2,075,835
COATED PAPER OR SHEET
Filed Aug. 17, 1931  2 Sheets-Sheet 1
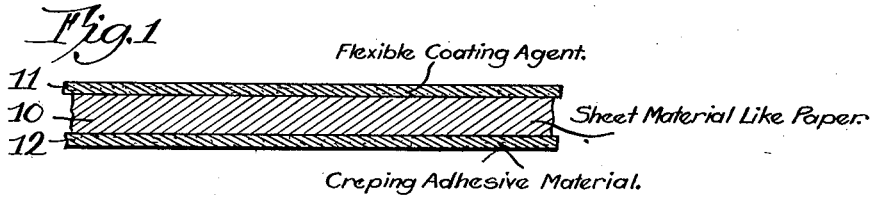
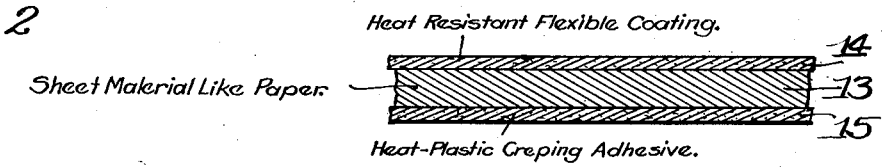
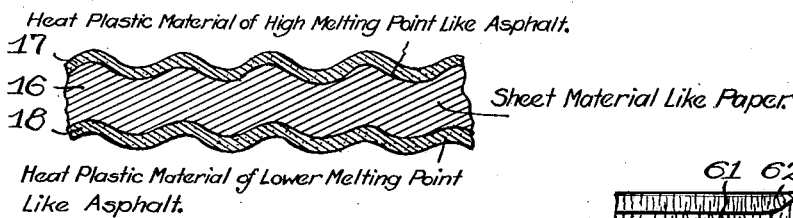
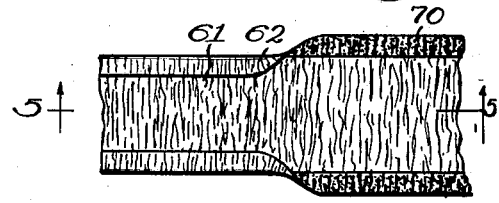
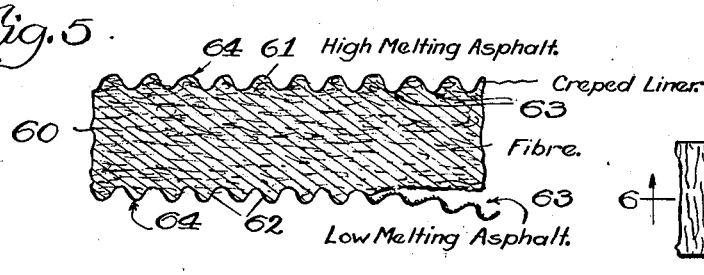
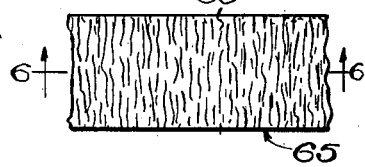
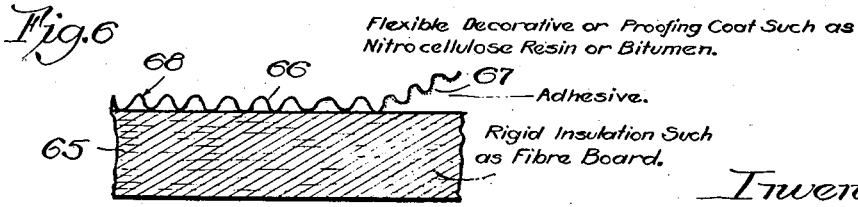

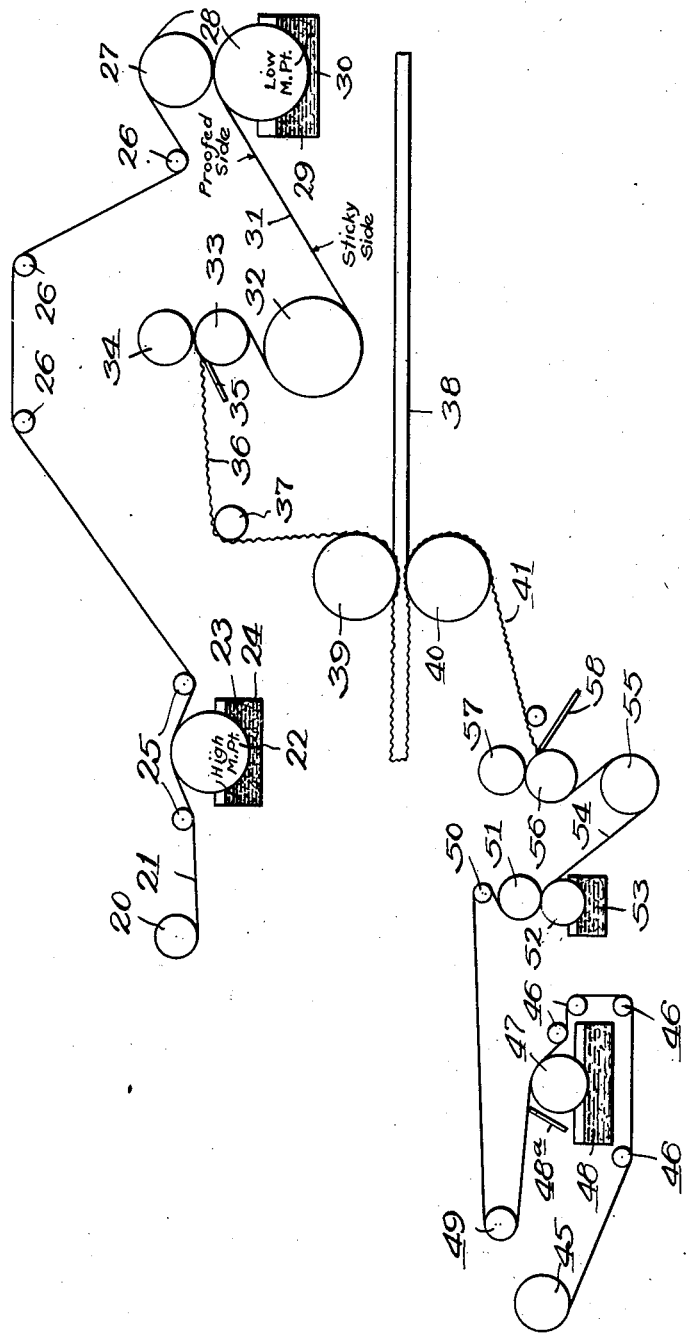

ated Apr. 6, 1937

2,075,835

UNITED STATES PATENT OFFICE 2,075,835

COATED PAPER OR SHEET

Allen L. Spafford, Cloquet, Minn., assignor, by direct and mesne assignments, of one-half to Wood Conversion Company, Cloquet, Minn., a corporation of Delaware, and one-half to The Paper Service Company, Cincinnati, Ohio, a corporation of Ohio Application August 17, 1931, Serial No. 557,564

8 Claims. (Cl. 154—28)

The present invention relates to a coated sheet, to the manufacture thereof, and to structures employing said sheet, and the manufacture of said structures. It has special reference to a coated paper adapted particularly for adhesive use, such as a liner for insulation blankets, and also to one which may be water-proof in character.

In the U. S. Rowe Patents No. 1,628,515 and No. 1,782,767 there are described several methods of creping heavy papers with a heat plastic material. In my recent U. S. Patent No. 1,774,573 there is described a method of simultaneously making such creped papers and embodying them in insulation blankets, employing the coated creped paper as a liner, and employing the heat plastic material as an adhesive to hold the liner to a mat of insulation material.

Certain disadvantages of the insulation product so made are inherent in the character of the liner. Because the liner is coated with heat plastic material only on the inner side, the outer side presents a fibrous surface, and is not water-proof. The nature of the creping process makes it difficult to coat both sides of the paper with the heat-plastic material. Where asphalt is employed as the heat plastic material, the single asphalt coating used in creping, renders the insulation blanket referred to water-proof on one side, but the uncoated side may absorb water and be thus materially weakened when wet. It is of course possible to water-proof the fiber side of the creped paper, but because it is creped, the recesses therein receive and retain abnormal amounts of proofing agent, wastefully, forming an uneven coating, with an additional disadvantage that the flexibility and elasticity of the final product is lessened. It is also disadvantageous to use certain types of water-proofing sizes or compositions on the fiber side of the paper because the same will stiffen the paper. This may seriously interfere with the hot creping operations, and the proofing agents may not withstand the heat of the creping operations. The fiber of the paper may be effectively saturated with a water-proofing agent, such as an oil, wax, tar, or low-melting-point asphalt. Such impregnation is not as desirable as the preferred embodiment of this invention wherein the fibers are not impregnated per se. The preferred embodiment on paper has the felted fibers in a dry felted state characteristic of paper, and has the two surfaces coated with the water-proofing agents. Thus the strength of the sheet is preserved, and can be maintained when the sheet is wet with water.

In accordance with the present invention I employ on the fiber side referred to a flexible heat-resistant material such as a heat-plastic material like asphalt having a higher melting point than the heat-plastic material employed in the creping process, whereby said fiber side may be economically coated or water-proofed without interfering with the creping process, or the properties of the creped product.

The material which is applied as a proofing agent on the fiber side should preferably not be tacky or sticky at ordinary temperatures or in a higher range, say from 60° F. to 120° F. A tacky coat would make the sheet difficult to handle and would cause it to stick to itself when rolled, or to rolls in machines, or to other things, according to the use of the paper. Such paper is desirably rolled for storage or shipment or in manufacture. It may be stacked in sheets, or used as wrappers on packages or articles, such as insulation blocks. In any such use adjacent layers should not stick. Of course, a sticky or tacky coating might be used and be dusted with talc, mica, or other powder, or be protected by special sheets of material to which it would not stick. As above stated it is preferable to use a high-melting-point asphalt which is not tacky or sticky under the various conditions given.

Although I have above referred particularly to creping, the present invention is not limited to creped paper or to creping processes, but contemplates an uncreped sheet having a heat-resistant flexible coating on one side and a heat-plastic material on the other side, or having heat plastic coatings on the two sides, which have separated melting points, so that the whole may be heated to melt or soften the lower-melting coating for adhesive purposes, without causing injury to the other substance, such as causing the higher melting substance to become adhesive. A further contemplation of the present invention is the use of a flexible water-proofing agent on one side of a sheet, which agent is resistant to heat applied to soften a coating on the other side to render said coating adhesive. It is particularly to be pointed out that the higher-melting point asphalt, which I prefer to employ may tend to become adhesive under heat which may be used when the lower-melting point asphalt is applied, or thereafter used in heating it to render it adhesive. In the event both coatings should become simultaneously adhesive when hot, on cooling the one becomes nonadhesive while the other remains adhesive. Also, I prefer to use the higher-melting asphalt in a much thinner coating, even impregnating to a slight degree only the surface of the sheet, and to use the adhesive and creping asphalt in a much thicker coating, so that there is a residual quantity for adhesive use, as in uniting the sheet to insulation material. The thinner the coat or film, the less is its tendency to be adhesive.

Thus by means of the present invention I provide a water-proofed sheet of material, such as paper, which may be creped, and which may be heated to cause one side to adhere to another surface.

One object of the invention is the manufacture of a sheet with coating materials thereon which may be treated to render one coat useful as an adhesive or as a creping adhesive.

A particular object of the present invention is the manufacture of a sheet which is waterproof on one side, and which has on the other side a heat-plastic material of adhesive character when hot.

A particular object is the manufacture of a creped sheet of paper having the qualities above referred to.

Another object of the invention is the coating of a sheet of material with heat-plastic substance on both sides, the substance on one side having a lower melting point than the substance on the other side.

Still another object is the manufacture of a sheet coated on one side with material which becomes adhesive when hot, and coated on the other side with any material which resists the heat required for adhesiveness of the first mentioned side.

A further object of the invention is the coating of a sheet on the two sides, with asphalt having different melting points on both sides.

Another object is the hot-creping with a heat-plastic material of a sheet which is coated on one side with a water-proof heat-plastic substance having a higher melting point than the creping material.

A still further object of the invention is the manufacture of an insulation blanket having an externally waterproofed plane or creped paper liner.

Various other objects and advantages of the invention will become apparent from the following description of the invention, and of the examplary embodiments thereof which are shown in the accompanying drawings, in which:

Fig. 1 represents in cross-section a sheet of doubly coated material suitable for creping or adhesive union to articles.

Fig. 2 represents in cross-section a sheet of doubly coated material suitable for creping with heat or applying to articles with heat.

Fig. 3 represents in cross-section a creped sheet of doubly coated creped material.

Fig. 4 represents apparatus and process diagrammatically illustrated for forming the sheets of Figs. 1 and 2, the creped sheet of Fig. 3, and the structures of Figs. 5, 6, 7 and 8.

Fig. 5 represents a cross-section of an elastic flexible insulation blanket, taken on the line 5—5 of Fig. 7.

Fig. 6 represents a cross-section of a rigid decorative panel or insulation structure, taken on line 6—6 of Fig. 8.

Fig. 7 is a plan view of a section of a continuous length of insulation blanket showing the manner of forming a sealed edge with the creped liners.

Fig. 8 represents in small scale a plan view of a panel covered with a creped sheet.

In carrying out the invention sheet material, such as heavy paper, cloth, cellulose, or other material in woven, felted, or film form, is coated on one side with a water-proofing agent which resists heat and which is flexible with the sheet. I prefer to use an asphalt, because it is cheap, but other materials may be used such as flexible synthetic resins, as described in the U. S. Byck Patent No. 1,590,079, which may be soluble in liquids in their physical forms before final reaction, and insoluble after final reaction, or other synthetic resins, such as those described in the U. S. Davis Patent No. 1,649,058, which may be soluble in finally reacted form and which are modified. Highly plasticized nitrocellulose films may be employed.

On the other side of the sheet material I apply while plastic a heat-plastic substance which is normally solid, flexible in thin layers, non-adhesive and non-tacky, but which may become adhesive or tacky on the application of heat. Preferably I employ a substance which softens or melts to a viscous or a fluid state on application of heat, and which later cools to its normal state.

For the preferred usages of this invention I employ asphalt or other bituminous substance of like character. This is an example of a non-reactive substance which can be repeatedly heated and cooled to bring about adhesiveness. Where coated paper is merely creped with a heat-plastic material, and is not to be subsequently employed for adhesive use, it may be creped with a plastic material such as synthetic resins referred to which are plastic either while cold or hot, and which react in situ on standing, or on application of heat, or other treatment, to form a flexible coating which may not become plastic when heated. Asphalt is one example of a single material which becomes adhesive when hot, but compositions of rubber and gums, or resins with this desired property are well known.

The two coating materials are so chosen relative to each other that the first-mentioned one, hereinafter referred to as the proofing coat, is capable of remaining effective, flexible and non-adhesive or non-tacky under heat which softens or is used with the second-mentioned coating, that is, the adhesive-coating or creping-coating. For some purposes I prefer that the proofing coating soften materially at the temperature at which the adhesive coating is liquid, or viscous, and adhesive.

Under the conditions last mentioned the sheet material carrying the proofing coat will be sufficiently flexible so that the sheet may be readily hot-creped using the adhesive coating materials as the hot-creping material.

By reason of the normal non-adhesive character of the two coats the coated sheet may be supplied in rolls, either creped or uncreped, for use as a covering agent applicable by heating the sheet to soften the adhesive coat to create its adhesive state without rendering the proofing coat simultaneously adhesive. Such material may be thus easily cemented to an insulation mat, in the manner illustrated and for the products referred to in my U. S. Patent No. 1,774,573.

Creped material may be water-proofed on both sides, and the coatings may be colored. Such material is attractive, flexible, strong and tough, is a good substitute for canvas, bunting and the like, and may be used for out-of-door decorations. In such use, it is so cheap, compared to fabric, that it may be destroyed after a short period of usefulness, as in building and street decoration.

In the drawings Fig. 1 shows a sheet, as of heavy paper 10, having a proofing coat 11, which is primarily flexible either in thin layers, or when impregnated into the sheet and which is preferably heat resistant. There is an adhesive coat 12 which is preferably heat-plastic or plastic and adhesive when heat is applied. The materials previously referred to may be used, but I prefer to use a high-melting-point asphalt as the proofing coat 11 and a lower-melting-point asphalt as the adhesive coat. In Fig. 1 the flexible coat 11 is not necessarily one which softens or melts, like asphalt. The resins referred to are examples of other materials which are primarily flexible. Where the adhesive coat is activated by heat, the coat 11 is suitably resistant to the applied heat and also flexible at the applied heat. Where creping may be effected with a plastic adhesive, not necessarily heated, the coating 11 need not be heat resistant, so long as it is flexible for permitting creping.

In Fig. 2 a sheet 13 is shown, such as heavy paper coated with a heat-resistant material 14 which may melt, and which becomes soft and extremely flexible, although not adhesive, when an adhesive coat 15 is liquid, or soft and adhesive, as in applying to the sheet, as in creping the sheet, or as in applying the doubly coated sheet to a surface with the aid of heat. I prefer the proofing coat 14 to be a high melting point asphalt and the adhesive coat 15 to be a lower melting point asphalt.

I prefer asphalt to the viscous synthetic resins because the asphalt is viscous when hot, for both coats, and it may be applied to merely coat or partly to impregnate the paper, without complete penetration or impregnation. A sheet coated with asphalt as shown in Fig. 2 may be torn and considerable material of the sheet, where it is a felted pulp sheet, may be readily seen as unimpregnated fibers.

In Fig. 3 a creped sheet is illustrated having a sheet base, such as kraft paper 16, coated with a proofing agent 17, which is heat-plastic and very flexible at a heat employed in creping, such as a high-melting-point asphalt. The other coat 18 may be any coat which is heat-plastic for use in the creping process. I may use a plastic or heat-plastic synthetic resin, or like-mixture capable of forming a synthetic resin, but I prefer to use a relatively chemically stable composition which is non-changeable with heat, within the limits of the process employed. Therefore, I prefer asphalt, and use the softening character of it with heat to form an adhesive coat.

The specific manner in which I carry out the invention for the manufacture of insulation blanket is illustrated in Fig. 4. The purpose is to feed a supply of the doubly-coated sheet, while hot and adhesive, to a mat of insulation, to secure the sheet to the mat as a liner therefor. I combine the heating and creping in one operation, and rather than supplying the proofed sheet from a roll, to the creping apparatus, I supply the sheet material itself and apply the two coats in the same machine which in character of operation is continuous.

A paper supply roll 20 feeds a sheet of heavy paper 21 such as kraft paper over a heated drum 22 which rotates in a bath of high-melting-point asphalt 23, in vat 24. Idler rolls 25 are employed on each side of the drum. A suitable melting point for the asphalt is 225° F. Great variation is permitted in the melting point of asphalt, and it is to be understood that it is not sharply defined. At its so-called melting point it is viscous or sufficiently liquid to be called melted, for spreading purposes. It may be previously melted at a higher temperature, such as 380° F., at which it is more liquid. I may incorporate a small quantity of wax, or paraffin into this asphalt while it is so fluid, to decrease the tackiness of the asphalt which may be exhibited at the heat used in creping. The addition of wax is not necessary and its addition may be omitted or controlled in accordance with the desired results and in accordance with the character of asphalt employed. It should also be understood that any asphalt having a so-called melting point of any particular degree or range, may be an admixture of a higher melting asphalt and a lower melting asphalt, and that any asphalt which is employed must be selected or modified for the conditions which are to be employed in using the present invention.

The drum 22 may be maintained at a temperature of 350° F. to 400° F. at which the asphalt is sufficiently liquid to provide a thin coating. After leaving the coating drum the coated sheet cools and the coating solidifies to a non-adhesive and non-tacky condition. A considerable length of path for travel and cooling is provided, in which idlers 26 may be used as is convenient or necessary for the apparatus. Where other materials are employed the travel after coating may be employed to cure the coating. For example, if the sheet is proofed with a synthetic resin of the flexible variety, or material forming synthetic resins, the finishing steps may be started or completely carried out to effect a coating which will resist a heat application or roll-contact which may follow in a creping process.

The coated sheet then passes around, with the coated side against a heated roller or drum 27 which is a companion roll for the heated coating drum 28. The latter drum revolves in a bath 29 of low-melting-point asphalt in vat 30. The drums 27 and 28 may be heated to a temperature of 225° F. for applying an asphalt which melts between 160° F. and 180° F., thus using the asphalt at a temperature at which it is sufficiently liquid to coat the paper. The doubly coated stretch of paper designated 31 is sticky on the last coated side, and runs over a water-cooled roll 32, whereby both sides are chilled to a non-tacky state. The last-coated side then runs against and around roll 33 which is heated with warm water to a creping temperature, sufficient to render the adhesive coat sticky, and soft, and the proofing coat soft and plastic, but non-tacky. A rubber surfaced pressure roll 34 presses on the proofed side of the sheet. A knife or doctor blade 35 crepes and peels the creped sheet from the roll. Thereafter the speed of travel of the creped sheet is reduced in proportion to the extent of creping. The creped stretch 36 is carried over a heated idler roll 37, and thence to means for disposing of the creped sheet.

The sheet may be otherwise constituted so that it can be cooled and rolled where the sheet alone is desired. The creping plastic employed may be varied to be non-adhesive under conditions where it is desired to so roll the sheet. However, in the preferred use of a lower-melting asphalt it is utilized immediately while hot and sticky on the adhesive side. Traveling at the same speed as the creped sheet, there is shown a traveling length of insulation or other material which is to be covered by the proofed paper. This may be a fiber board which is rigid, fed in a long length or in abutting or separated pieces of fiber board or other rigid or flexible materials. In the drawings I have illustrated a flexible fibrous mat which may be of animal fiber, such as hair, mineral fiber, such as asbestos or glass wool, or vegetable fiber, such as flax, eel grass, ground wood fiber, or chemically pulped vegetable matter. I prefer to use wood fibers adhesively united in the manner described in the U. S. Weiss Patent No. 1,336,402, known as "balsam wool".

Any such mat or other material, designated 38 is fed between two rolls 39 and 40, along with the creped liner 36. The roll 39 is heated to unite adhesively the mat 38 and the liner 36.

I prefer to use some other liner 41, preferably a similarly coated and creped liner, which passes over roll 40, likewise heated. The process and apparatus employed for the liner 41 is substantially the same in its essential parts as previously described and are but briefly described. A paper supply roll 45 feeds paper around idlers 46, to pass it over a coating drum 47 running in high melting point asphalt 48. A scraper 48a is indicated to remove excess asphalt. The coated sheet is looped over idler 49 and carried to idler 50 providing a cooling path. The cooled coated side passes over and against heated roll 51 presenting the fiber side to coating drum 52 running in low melting point asphalt 53. The doubly coated sheet 54 runs over cooling roll 55, thence over the creping roll 56 and between it and the pressure roll 57, having associated doctor blade 58 and thence as creped liner 41 to heated roll 40.

The final product which is obtained by the process specifically described is a water-proofed flexible, tough insulation blanket having elasticity in the direction across the crepe. It will be understood that other creping may be added to give elasticity in several directions or in any direction. The product is shown in detail in Fig. 5. The numeral 60 represents insulation material such as adhesively united wood fibers; the numerals 61 and 62 represent the two creped paper liners; the numeral 63 represents the zone of adhesive asphalt between a liner and the mat; and the numeral 64 represents the asphalt coating on the outside of the liner.

Fig. 6 represents a product which may be made as above described, feeding a rigid section, such as fiber board 65, to the creped sheet 66, carrying the creping adhesive 67, such as asphalt. The sheet may be cheap ordinary kraft paper coated with a decorative or proofing coat 68, such as asphalt for water-proofness, or such as plasticized and pigmented nitrocellulose which is flexible, or a flexible synthetic resin, which may be pigmented. Where a creping adhesive is used like asphalt, which becomes adhesive on applying heat, the paper covering or other liner 66, whether creped or uncreped, may be supplied to the rigid board 65.

In making the panel of Figs. 6 and 8 the creped sheet 66 and board 65 may have coincident edges. In making the insulation blanket one liner 62 may be wider, as shown at 70 in Fig. 7, and the mat 60 and other liner 61 may have coincident edges. The wider liner may have its edges folded over the edge and cemented to the narrow liner. It may be sealed with asphalt, which may be applied hot or which may be already on the paper and be sufficiently adhesive to cement and seal the sheets. Thus a water-proofed sleeve is formed. Any length of the strip may be severed and the cut edges be sealed by cementing a strip of similar paper to the two liners, thus making a water-proof and water-resistant envelope.

It is also to be understood that although I have herein described one method of making the creped sheet directly from a sheet of uncoated paper, the invention may be carried out by coating each side with the materials which are normally flexible with the sheet, such as high-melting asphalt on one side, and low-melting asphalt, or other material which becomes adhesive when heated. Such a coated uncreped paper may be passed over a heating roll from a supply thereof to render one side adhesive for the purpose of creping the same. More adhesive may be applied at the same time, if desired, where its function is for adhesion rather than for creping.

Although I have described the use of heated asphalt for coating the sheet initially it is to be understood that I do not limit the application of asphalt to this method. Asphalt emulsions may be employed. Such emulsions commonly contain water. In the drawings the traveling coated paper is illustrated as undergoing curing, which may be drying water from an applied emulsion, cooling a hot coat of asphalt, or even the reacting of a synthetic resin where that is employed, or the drying of solvent from a cellulose base, such as nitrocellulose or cellulose acetate.

The same asphalt or other material may be applied on two sides of a paper. One coat may be wet with a solvent or other liquid, so that the combined liquid and coating become a plastic and adhesive coating. Creping may be thus effected and a creped sheet may be adhesively united to another object. For example, high-melting asphalt may be coated onto both sides of the sheet, and one side run over a roll, which, instead of being heated, is wet with a volatile solvent, such as benzol or naphtha, for the asphalt, or a solution of asphalt. The liquid thus renders the coating plastic and effective to permit creping and/or adhesion. Solvent may thereafter be removed by evaporation.

Various other modifications of the invention may be made and it is to be understood that the invention is not to be considered as limited by the specific examples herein given as illustrative of the invention. In the appended claims I aim to define the invention to include such changes and modifications as fall within the scope of the claims.

I claim:

1. The method of making a water-proof insulation material consisting of a fibrous elastic core and a covering sheet which comprises coating one side of a flexible sheet material with a waterproofing substance which produces a flexible coated sheet, applying a heat-responsive adhesive to the other surface of the sheet, passing the sheet over a roll with the adhesively coated side in contact with the roll to cause it to adhere thereto, stripping the sheet from said roll whereby the paper is creped, and then uniting the creped sheet to a fibrous elastic core by means of the adhesive previously applied thereto for creping, the waterproof coating material being non-tacky or non-adhesive under the conditions of uniting the adhesive side of the sheet to the insulating core.

2. The method of making a water-proof insulation material consisting of a fibrous core and a covering sheet which comprises coating one side of a flexible sheet material with a waterproofing substance which produces a flexible coated sheet, applying a heat-responsive adhesive to the other surface of the sheet, passing the sheet over a roll with the adhesively coated side in contact with the roll to cause it to adhere thereto, stripping the sheet from said roll whereby the paper is creped, and then uniting the creped sheet to a fibrous core by means of the adhesive previously applied thereto for creping, the water-proof coating material being non-tacky or non-adhesive under the conditions of uniting the adhesive side of the sheet to the insulating core.

3. The method of making insulating material consisting of a fibrous core and a covering sheet which comprises coating one side of a flexible sheet with a high-melting bituminous substance which is flexible with the paper when normally cold, applying to the other side of said sheet a hot plastic lower-melting asphalt which is adhesive when hot and plastic and which when normally cold is non-adhesive and flexible with the paper, passing the sheet over a roll with the adhesively coated side in contact with the roll to cause it to adhere thereto, stripping the sheet from said roll whereby the paper is creped, and then uniting the creped sheet to a fibrous core by means of the adhesive previously applied thereto for creping.

4. The method of making a water-proof insulation material for heat and/or sound having an insulating core and a covering sheet, which comprises coating one side of a flexible sheet material with a water-proofing agent which produces a flexible coated sheet, applying a heat-responsive adhesive to the other side of said sheet, passing the sheet over a roll with the adhesively coated side in contact with the roll to cause it to adhere thereto, stripping the sheet from said roll whereby the paper is creped, and then uniting the creped sheet to an insulating core by means of the adhesive previously applied thereto for creping, the water-proof coating material being non-tacky or non-adhesive under the conditions of uniting the adhesive side of the sheet to the insulating core.

5. The method of making a water-proof insulation material for heat and/or sound having an insulating core and a covering sheet, which comprises coating one side of a sheet of paper with a water-proofing agent which produces a flexible coated sheet, applying a heat-responsive adhesive to the other side of said sheet, passing the sheet over a roll with the adhesively coated side in contact with the roll to cause it to adhere thereto, stripping the sheet from said roll whereby the paper is creped, and then uniting the creped sheet to an insulating core by means of the adhesive previously applied thereto for creping.

6. The method of making insulation for heat and/or sound which comprises applying a heat plastic adhesive to one side of a flexible sheet, applying a coating on the other side of said sheet, passing said sheet over a heated roll with the adhesive side against the roll whereby the sheet adheres to the roll, stripping the said sheet from the heated roll whereby the sheet is creped, and adhesively uniting the creped sheet by said adhesive to an insulating core, said coating being non-tacky or non-adhesive under the conditions of uniting the adhesive side of the sheet to the insulating core.

7. An insulation material for heat and/or sound comprising an insulating core, and a creped paper liner secured to a face of the core, said liner having unimpregnated felted fibers at the interior thereof, having a coating on the outside thereof which follows the contour of the creping, and having a heat-activated adhesive between said fibers and said core, said outside coating being non-adhesive and non-tacky when said inner substance becomes adhesive with heat.

8. An insulation material for heat and/or sound comprising an insulating core, and a creped paper liner secured to a face of the core, said liner having unimpregnated felted fibers at the interior thereof, having a coating of high melting point asphalt on the outside thereof which follows the contour of the creping and a coating of low melting point asphalt on the innerside thereof adhesively uniting said sheet to the core.

ALLEN L. SPAFFORD.